United States Patent
Yabe et al.

(10) Patent No.: US 11,118,693 B2
(45) Date of Patent: Sep. 14, 2021

(54) GATE VALVE

(71) Applicant: IRIE KOKEN CO.,LTD., Tokyo (JP)

(72) Inventors: Manabu Yabe, Tokyo (JP); Shinya Yamaguchi, Tokyo (JP); Yusuke Suga, Tokyo (JP)

(73) Assignee: IRIE KOKEN CO., LTD., Tokyo (JP)

( * ) Notice: Subject to any disclaimer, the term of this patent is extended or adjusted under 35 U.S.C. 154(b) by 31 days.

(21) Appl. No.: 16/815,692

(22) Filed: Mar. 11, 2020

(65) Prior Publication Data

US 2020/0355275 A1    Nov. 12, 2020

Related U.S. Application Data

(63) Continuation of application No. PCT/JP2019/018240, filed on May 7, 2019.

(51) Int. Cl.
*F16K 1/30*     (2006.01)
*F16K 3/02*     (2006.01)
(Continued)

(52) U.S. Cl.
CPC .............. *F16K 3/0254* (2013.01); *F16K 3/34* (2013.01); *F16K 47/023* (2013.01)

(58) Field of Classification Search
CPC .......... F16K 3/0254; F16K 3/184; F16K 3/34; F16K 47/023; F16K 31/025;
(Continued)

(56) References Cited

U.S. PATENT DOCUMENTS 5,755,255 A * 5/1998 Iwabuchi ............... F16K 3/184
                                                                137/341
6,079,693 A * 6/2000 Ettinger ................. F16K 3/188
                                                                251/195
(Continued)

FOREIGN PATENT DOCUMENTS

JP    2000-227166 A    8/2000
JP    2002-303372 A    10/2002
(Continued)

*Primary Examiner* — Minh Q Le
(74) *Attorney, Agent, or Firm* — Muncy, Geissler, Olds & Lowe, P.C.

(57) ABSTRACT

A gate valve that opens or closes opening parts of a valve box with a valve plate includes a valve rod that moves upward or downward and tilt inside the valve box; a drive mechanism that moves the valve rod upward or downward by a predetermined stroke and tilts the valve rod; a stopper mechanism that includes a spring return type stopper pin, and in which, when compressed air is supplied, a pin rod of the stopper pin moves forward in a horizontal direction, and a cam plate connected to the valve rod or a load receiving roller attached to the cam plate collides with the pin rod to regulate an upward movement of the valve rod. When the supply of the compressed air is stopped, the pin rod moves backward in the horizontal direction due to a reaction force of the spring, so that the cam plate or the load receiving roller does not collide with the pin rod and the regulation on the upward movement of the valve rod is released; and a vibration reducing device that reduces vibration.

5 Claims, 8 Drawing Sheets

(51) Int. Cl.
*F16K 47/02* (2006.01)
*F16K 3/34* (2006.01)

(58) Field of Classification Search
CPC ......... F16K 99/0001; F16K 2099/0074; F15C 5/00; G05D 23/1921
USPC ....... 251/110, 195, 198, 201, 203, 327, 167, 251/211
See application file for complete search history.

(56) References Cited

U.S. PATENT DOCUMENTS

| | | | | |
|---|---|---|---|---|
| 6,082,706 | A * | 7/2000 | Irie | F16K 51/02 251/158 |
| 6,237,892 | B1 * | 5/2001 | Ito | F16K 3/184 251/193 |
| 6,302,372 | B1 * | 10/2001 | Sauer | C23C 14/568 251/167 |
| 6,390,448 | B1 * | 5/2002 | Kroeker | F16K 3/188 251/167 |
| 6,913,243 | B1 * | 7/2005 | Tomasch | F16K 3/18 251/167 |
| 7,066,443 | B2 * | 6/2006 | Ishigaki | F16K 51/02 251/195 |
| 8,177,190 | B2 * | 5/2012 | Maerk | F16K 51/02 251/158 |
| 9,151,393 | B2 * | 10/2015 | Choi | H01L 21/67126 |
| 10,302,225 | B2 * | 5/2019 | Ehrne | F16K 3/188 |
| 10,352,480 | B2 * | 7/2019 | Kim | F16K 3/02 |
| 2004/0011985 | A1 * | 1/2004 | Osawa | F16K 3/184 251/158 |
| 2005/0045846 | A1 * | 3/2005 | Iwabuchi | F16K 3/184 251/193 |
| 2005/0092953 | A1 | 5/2005 | Hayashi et al. | |
| 2011/0095218 | A1 * | 4/2011 | Schoch | F16K 51/02 251/157 |
| 2012/0068100 | A1 * | 3/2012 | Ogawa | F16K 3/184 251/329 |
| 2012/0258242 | A1 * | 10/2012 | Tsunoda | C23C 14/3464 427/131 |
| 2014/0131603 | A1 * | 5/2014 | Blecha | F16K 51/02 251/158 |
| 2014/0183391 | A1 * | 7/2014 | Blecha | F16K 51/02 251/158 |
| 2015/0014556 | A1 * | 1/2015 | Ishigaki | F16K 51/02 251/12 |
| 2016/0245412 | A1 * | 8/2016 | Yang | F16K 3/0254 |
| 2018/0051825 | A1 * | 2/2018 | Ehrne | F16K 3/18 |

FOREIGN PATENT DOCUMENTS

| | | |
|---|---|---|
| JP | 2005-140151 A | 6/2005 |
| JP | 2007-107655 A | 4/2007 |

\* cited by examiner

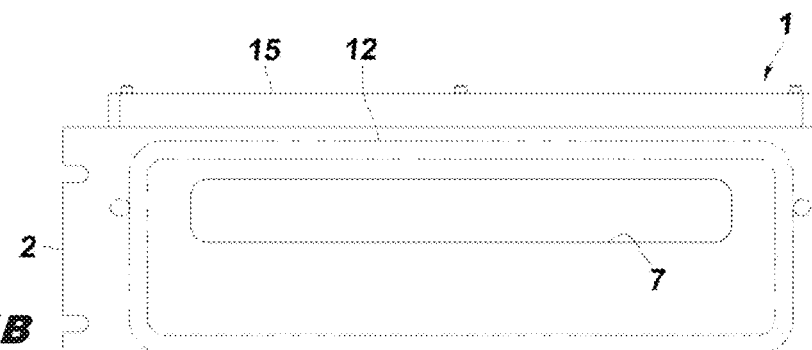
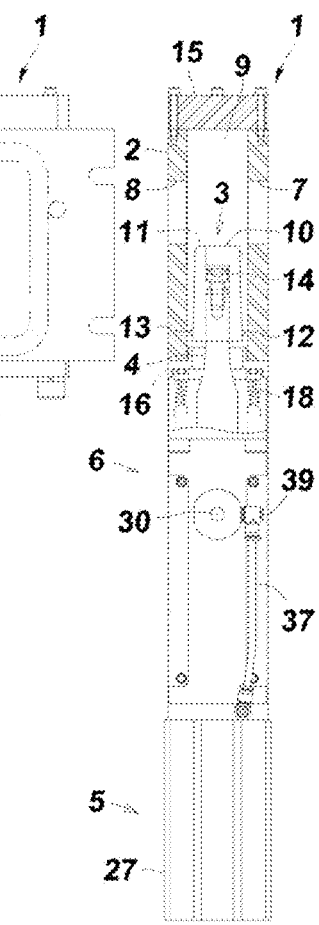
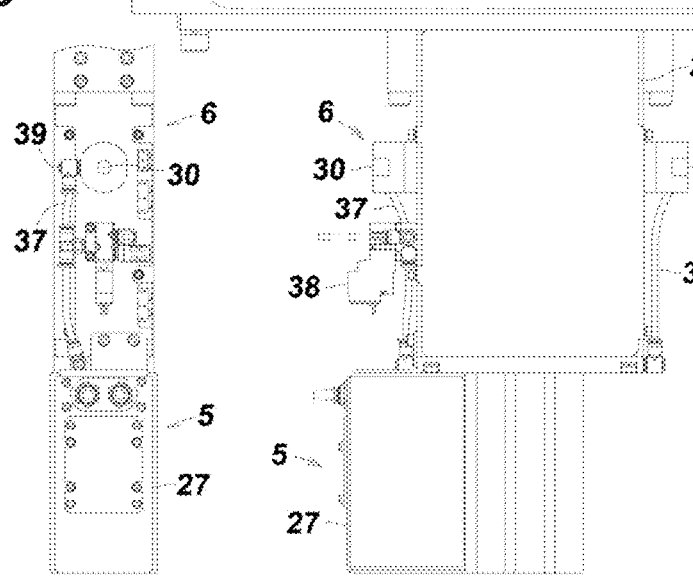
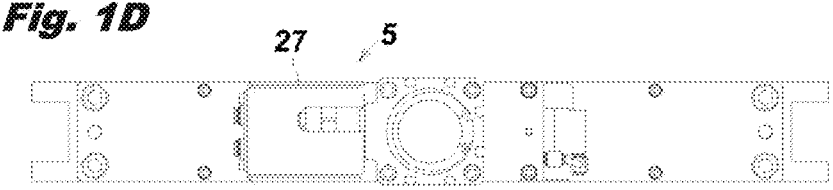
Fig. 1A  Fig. 1C
Fig. 1B
Fig. 1D

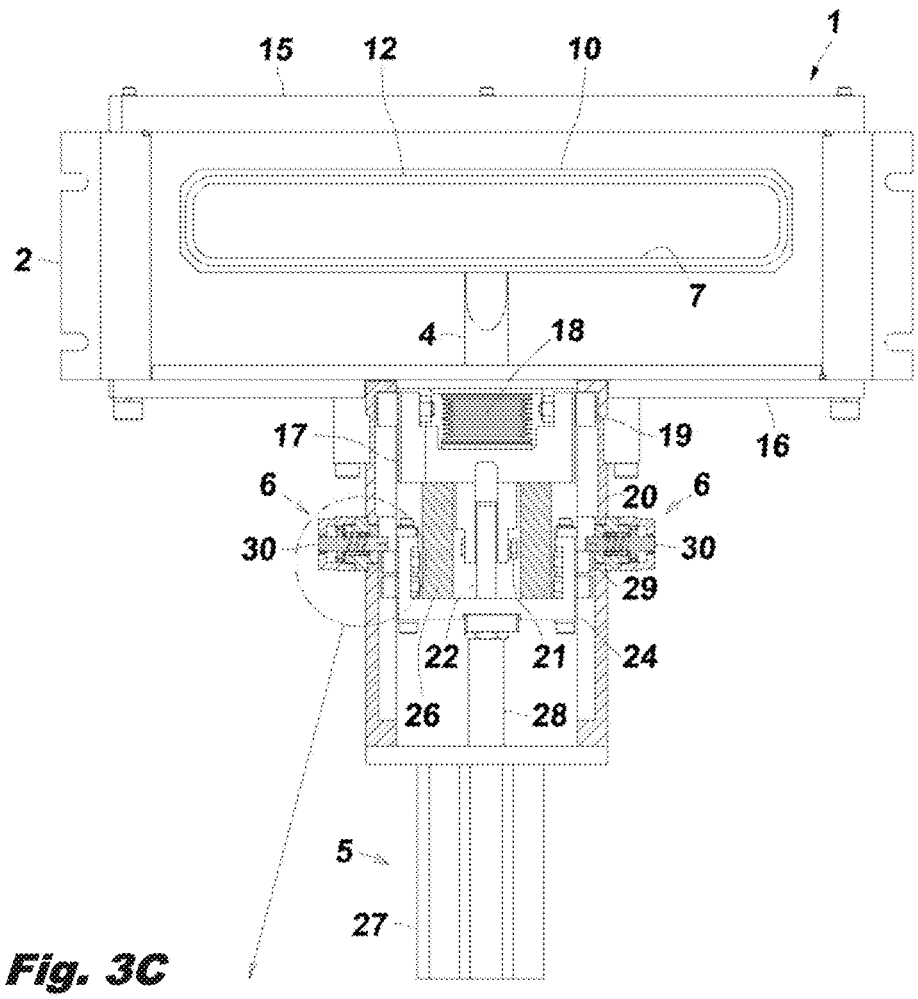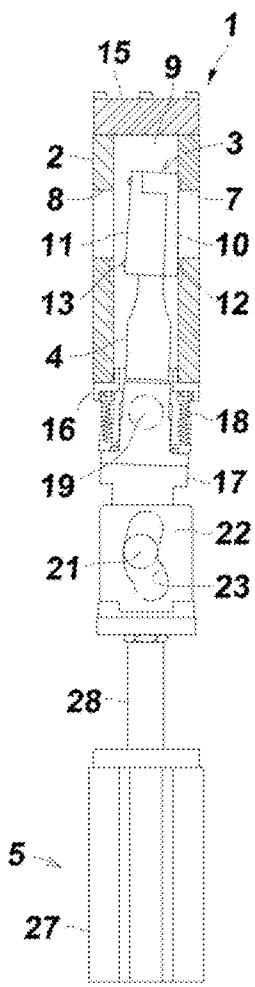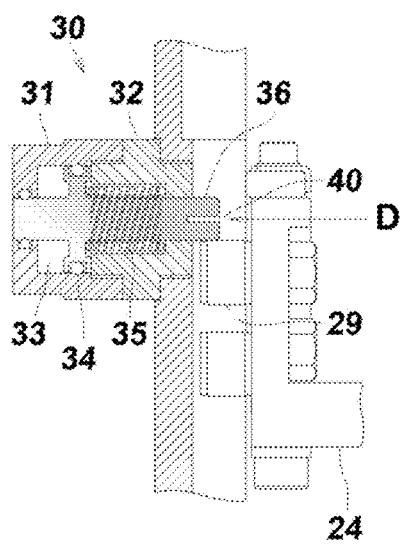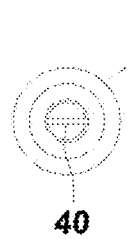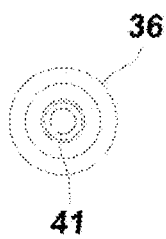

*Fig. 4A* *Fig. 4B* *Fig. 4C*
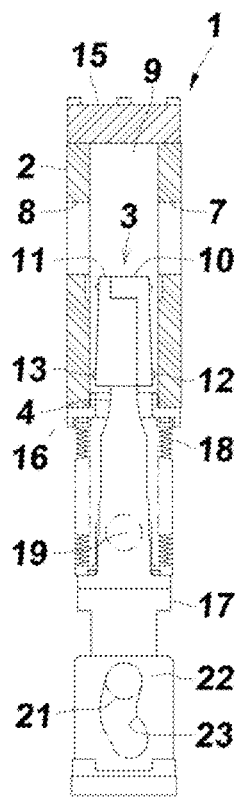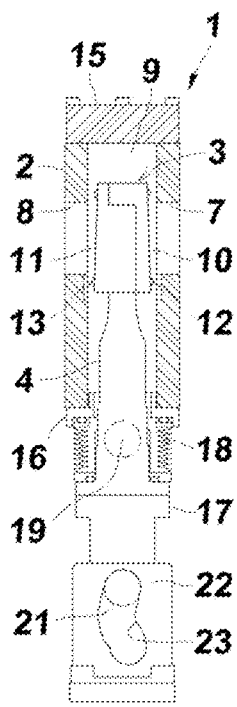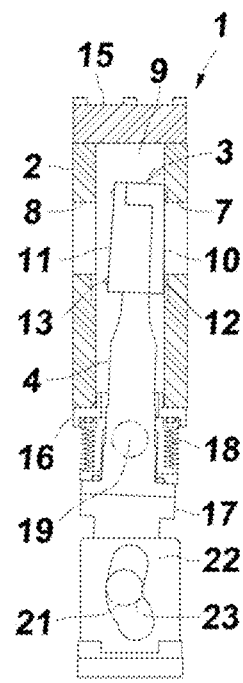

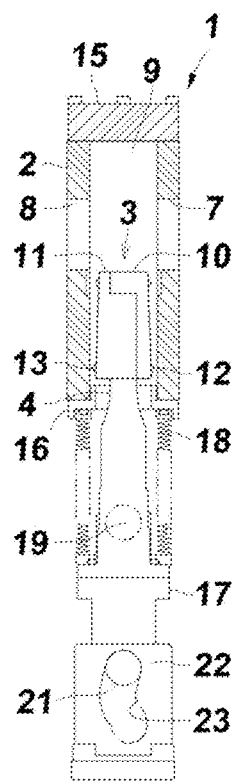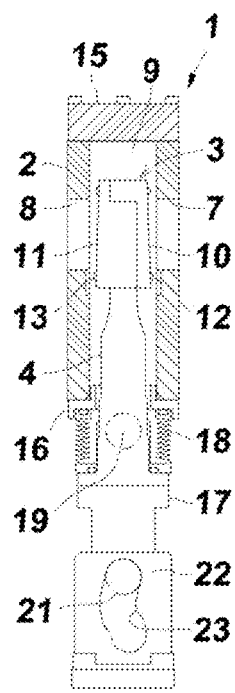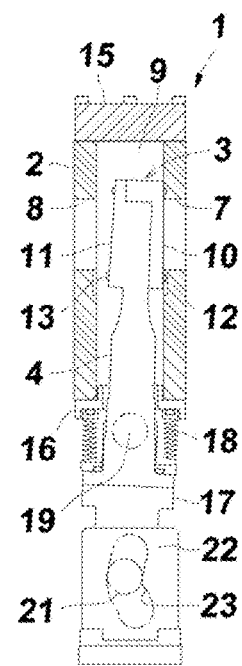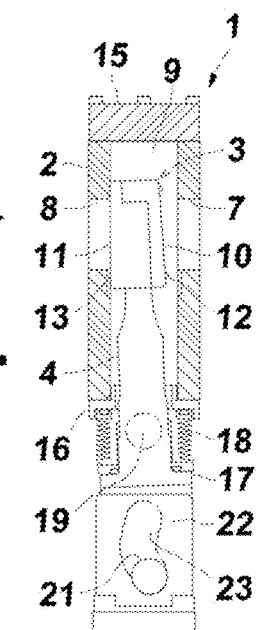

Fig. 7A
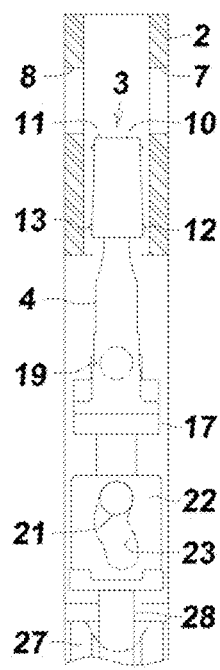
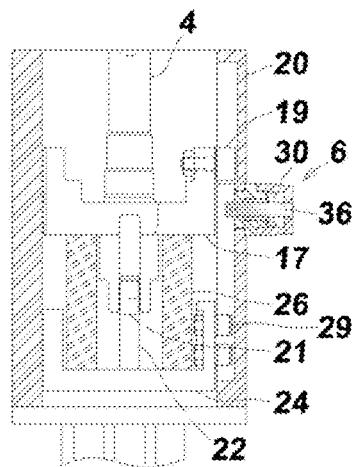
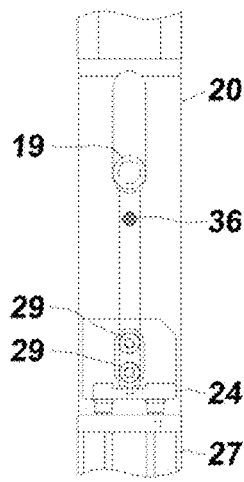
Fig. 7B
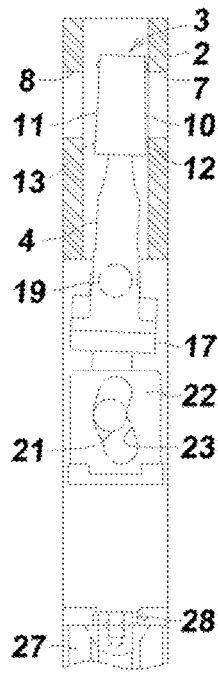
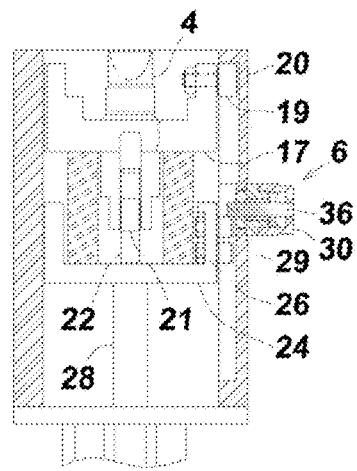
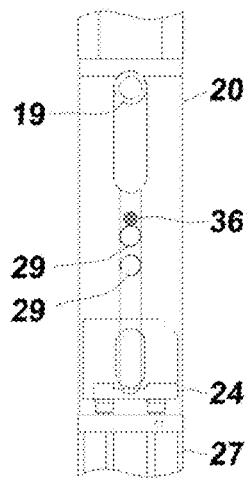
Fig. 7C
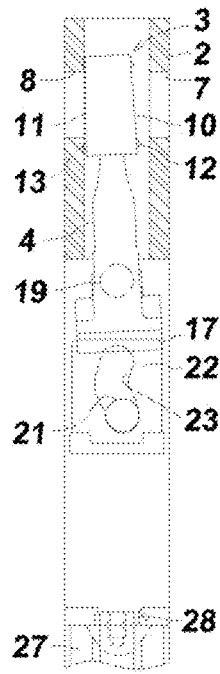
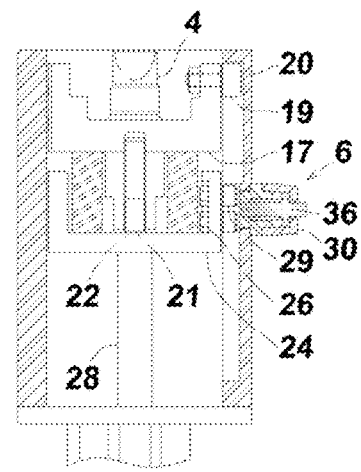
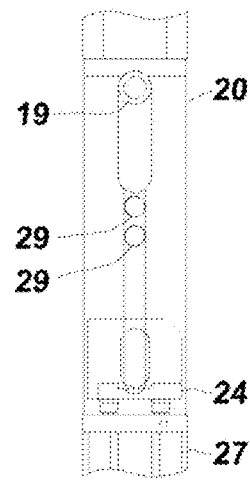

GATE VALVE

CROSS REFERENCE TO RELATED APPLICATIONS

This application is a continuation of International Application No.: PCT/JP2019/018240, which was filed on May 7, 2019, and which is herein incorporated by reference.

TECHNICAL FIELD

The present invention relates to a double-sided seal type gate valve installed between two chambers.

BACKGROUND

Conventionally, as a valve of this type, a gate valve disclosed in the following Patent Document 1 is known. This gate valve includes a valve disk, a valve rod, a first moving device, and a linking device. The valve rod tilts with a stroke end of the linking device as a fulcrum point, and the valve disk is pressed against a valve seat. In the middle of a stroke of the linking device, a stopper for stopping a stroke operation of the linking device and a second moving device for moving the stopper to allow the stopper to stop the stroke operation are provided. Further, when the valve disk moves to a stroke position not facing the valve seat, the stopper is moved by the second moving device to stop the stroke operation of the linking device, and, in this state, the first moving device causes the valve disk to tilt, and the valve disk is pressed in the same direction as the valve seat.

RELATED ART

Patent Document(s)

[Patent Doc. 1] JP Laid-Open Patent Application Publication 2002-303372

According to the conventional gate valve disclosed in Patent Document 1, a piston cylinder device as the second moving device causes the stopper to protrude to stop the stroke operation of the linking device. In this case, the stopper stops the movement of the linking device by colliding with a pivot (fulcrum point), and thus, there is a problem that vibration occurs due to an impact during the collision. However, no measure has been taken against this vibration in the conventional gate valve.

Therefore, the present invention has been accomplished in order to solve such a problem, and is intended to realize, in a double-sided seal type gate valve, stable sealing performance when the valve is closed by a valve plate by reducing vibration that occurs during operation.

SUMMARY

A gate valve, disclosed in the application, that opens or closes opening parts provided on both sides of a valve box with a valve plate arranged inside the valve box, includes a valve rod that is connected to the valve plate and is supported to be able to move upward or downward and tilt inside the valve box; a drive mechanism that is provided outside the valve box and moves the valve rod upward or downward by a predetermined stroke and tilts the valve rod; a stopper mechanism that includes a spring return type stopper pin provided in middle of the stroke of the drive mechanism, and in which, when compressed air is supplied, a pin rod of the stopper pin moves forward in a horizontal direction orthogonal to a stroke direction of the valve rod against a spring force of a spring, and a cam plate connected to the valve rod or a load receiving roller attached to the cam plate collides with the pin rod to regulate an upward movement of the valve rod, and, on the other hand, when the supply of the compressed air is stopped, the pin rod moves backward in the horizontal direction due to a reaction force of the spring, so that the cam plate or the load receiving roller does not collide with the pin rod and the regulation on the upward movement of the valve rod is released; and a vibration reducing device that reduces vibration generated when the valve rod is operated by the drive mechanism.

As the vibration reducing device, the pin rod of the stopper pin may be subjected to slit-processing or counterbore-processing to reduce an impact during a collision with the cam plate or the load receiving roller.

As the vibration reducing device, a delay circuit may be provided that sets a speed, at which the valve plate starts to move away from a valve seat surface of the valve box when the valve is opened, to a low speed.

A valve plate surface of the valve plate may tilt such that an O-ring fixed to the valve plate is parallelly pressed against a valve seat.

According to the gate valve of the present invention, the following effects are achieved. By adopting the stopper mechanism that regulates or releases the regulation on the upward movement of the valve rod by moving forward or backward by supplying compressed air or stopping the supply of the compressed air, it is not necessary to control the stopping of the valve rod at a predetermined position by adjusting a pressure. Further, by providing the vibration reducing device that reduces the vibration generated during the operation of the valve rod, the sealing performance when the valve is closed by the valve plate can be stabilized by suppressing the vibration during the operation, and dust generation can be suppressed.

BRIEF DESCRIPTION OF THE DRAWINGS

FIGS. 1A-1D are overall views of a gate valve according to the present invention, FIG. 1A is a front view, FIG. 1B is a left side view of a main part, FIG. 1C is a right side partial cross-sectional view, and FIG. 1D is a bottom view.

FIG. 2A is a front cross-sectional view, and FIG. 2B is a right side cross-sectional view.

FIGS. 3A-3E illustrate a "CLOSE 1" state when a first valve plate of the gate valve according to the present invention closes a first opening part, FIG. 3A is a front cross-sectional view, FIG. 3B is a right side cross-sectional view, FIG. 3C is an enlarged cross-sectional view of a stopper pin portion, FIG. 3D is an end view of a slit-processed pin rod as viewed from an arrow D direction, and FIG. 3E is an end view of a counterbore-processed pin rod.

FIGS. 4A-4C are explanatory diagrams for an operation from the "OPEN" state to the "CLOSE 1" state of the gate valve according to the present invention, FIG. 4A illustrates the "OPEN" state, FIG. 4B illustrates a state when the operation is started, and FIG. 4C illustrates the "CLOSE 1" state when the operation is ended.

FIG. 5A is front cross-sectional view, FIG. 5B is right side cross-sectional view, and FIG. 5C is an enlarged cross-sectional view of a stopper pin portion.

FIGS. 6A-6D are explanatory diagrams for an operation from the "OPEN" state to the "CLOSE 2" state of the gate valve according to the present invention, FIG. 6A illustrates the "OPEN" state, FIG. 6B illustrates a state when the operation is started, FIG. 6C illustrates a state when the gate valve is passing through a "CLOSE 1" position, and FIG. 6D illustrates the "CLOSE 2" state when the operation is ended.

FIGS. 7A-7C each illustrate a main part right side cross-sectional view, a main part front cross-sectional view, and a main part right side plan view of the gate valve according to the present invention, FIG. 7A illustrates a state before a sealing operation, FIG. 7B illustrates a state during the sealing operation, and FIG. 7C illustrates a state during a maintenance operation.

Figure 2A:
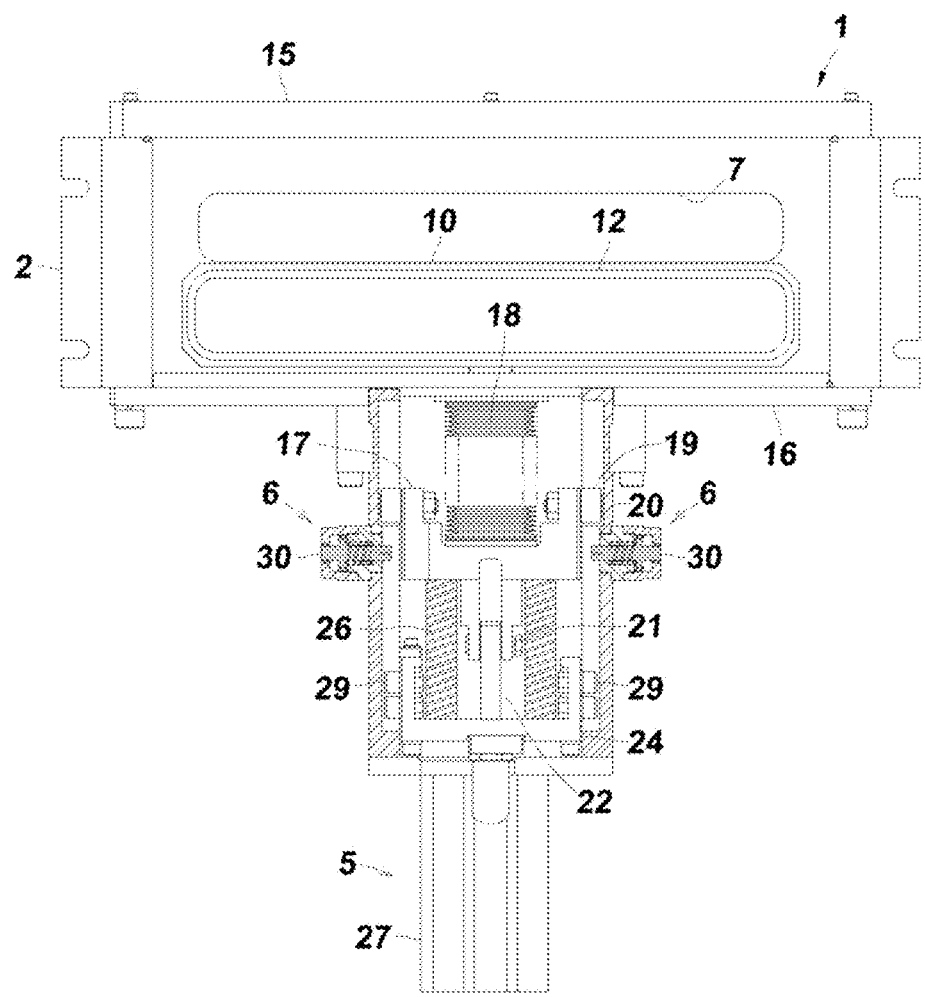
FIGS. 2A and 2B illustrate an "OPEN" state when the gate valve according to the present invention is fully open.

DETAILED DESCRITPION OF THE
PREFERRED EMBODIMENT(S)

In the following, an embodiment of the present invention is described in detail with reference to the drawings.

As illustrated in FIGS. 1A-1D, a gate valve 1 of the present embodiment is for isolating a vacuum and a vacuum or a vacuum and the atmosphere in a device for manufacturing a flat panel display or a semiconductor substrate, and is used for isolating various processes in manufacturing a display or a substrate. The gate valve 1 is a double-sided seal type gate valve of a so-called valve box type, and is configured to include a flat rectangular valve box 2, valve plates 3 housed inside the valve box 2, a valve rod 4 connected to the valve plates 3, a drive mechanism 5 that moves the valve rod 4 upward or downward a predetermined stroke and tilts the valve rod 4, a stopper mechanism 6 that regulates or releases regulation on an upward movement of the valve rod 4, and a vibration reducing device that reduces vibration generated when the valve rod 4 is operated by the drive mechanism 5.

Elongated opening parts (a first opening part 7 and a second opening part 8) for allowing a substrate to pass through are respectively provided on left and right walls of the valve box 2. A process chamber (not illustrated in the drawings) is connected to an outer wall of the first opening part 7, and a transfer chamber (not illustrated in the drawings) is connected to an outer wall of the second opening part 8. Then, a substrate transferred from the transfer chamber to the process chamber through the valve box 2 is kept in a closed environment by closing the gate valve 1, and, inside the process chamber, various treatments such as heat, gas, and plasma treatments are performed for film formation.

Figure 2B:
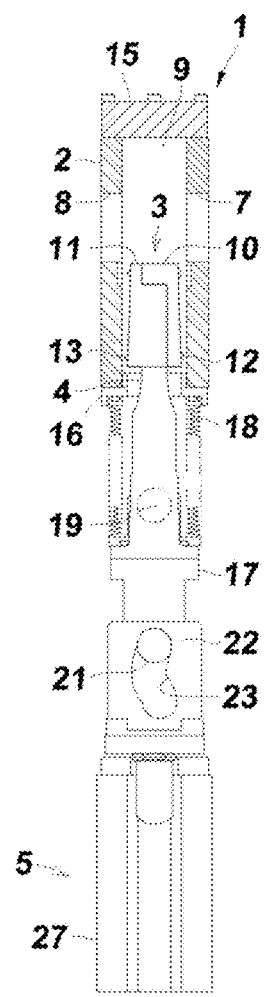

As illustrated in FIGS. 2A and 2B, in an inner space 9 of the valve box 2, the pair of valve plates 3 (a first valve plate 10 and a second valve plate 11) for selectively opening or closing the opening parts 7, 8 are arranged facing each other. O-rings 12, 13 each as an elastic seal material having a size slightly larger than that of the first opening part 7 and the second opening part 8 are respectively fitted and fixed to outer-side surfaces of the first valve plate 10 and the second valve plate 11.

As illustrated in FIG. 1C, by being fixed to each other by a bolt 14, the first valve plate 10 and the second valve plate 11 are connected to each other and integrated in a manner of being dividable, and are formed as a whole in a tapered shape that gradually tapers from a lower part of a valve plate surface toward an upper part of the valve plate surface. In this way, when the valve plate surface of the valve plate 11 tilts and thereby the valve is closed, the O-rings 12, 13 are pressed parallelly (with equal forces) against valve seats. Further, the valve rod 4 is detachably attached to a center of the second valve plate 11 by the bolt 14, and it is possible to remove the whole set of the valve plates 3 from the valve rod 4 or to remove only one of the valve plates 3 (for example, the first valve plate 10). The removed valve plates 3 (10, 11) are removed to the outside by removing a maintenance flange 15 that covers a top surface of the valve box 2 and opening a lid, and maintenance work such as surface cleaning or replacement of the O-rings 12, 13 can be performed.

The valve rod 4 penetrates a center of a bonnet flange 16 that covers a bottom surface of the valve box 2, and extends to the outside of the valve box 2. At an intermediate position of the valve rod 4, a rod guide 17 that supports the valve rod 4 and guides movement of the valve rod 4 is provided. Further, an expandable and contractible metal bellows 18 such as a welding bellows or a molded bellows is attached between the rod guide 17 and the bonnet flange 16 so as to cover around the valve rod 4, and the valve rod 4 is completely shielded from the outside.

A fulcrum roller 19 is provided above the rod guide 17, and is rotatably supported by a roller guide 20 that supports the valve box 2. Further, a direction switching roller 21 is provided at a lower end of the valve rod 4. As illustrated in FIG. 2B, the direction switching roller 21 is slidably supported by engaging with a cam groove 23 that is provided on a cam 22 and has a cross section bent into a "<" shape, and a cam plate 24 supporting the cam 22 is integrally connected to a lower end of the cam 22. Further, a coil spring 26 is attached between the cam plate 24 and the rod guide 17, and a piston rod 28 of an air cylinder 27 for moving upward or downward as the drive mechanism 5 is connected to a center part of a lower end of the cam plate 24. Load receiving rollers 29 as force points are attached on both left and right ends of the cam plate 24, and are supported in a manner capable of moving upward or downward along the roller guide 20.

Figure 5A:
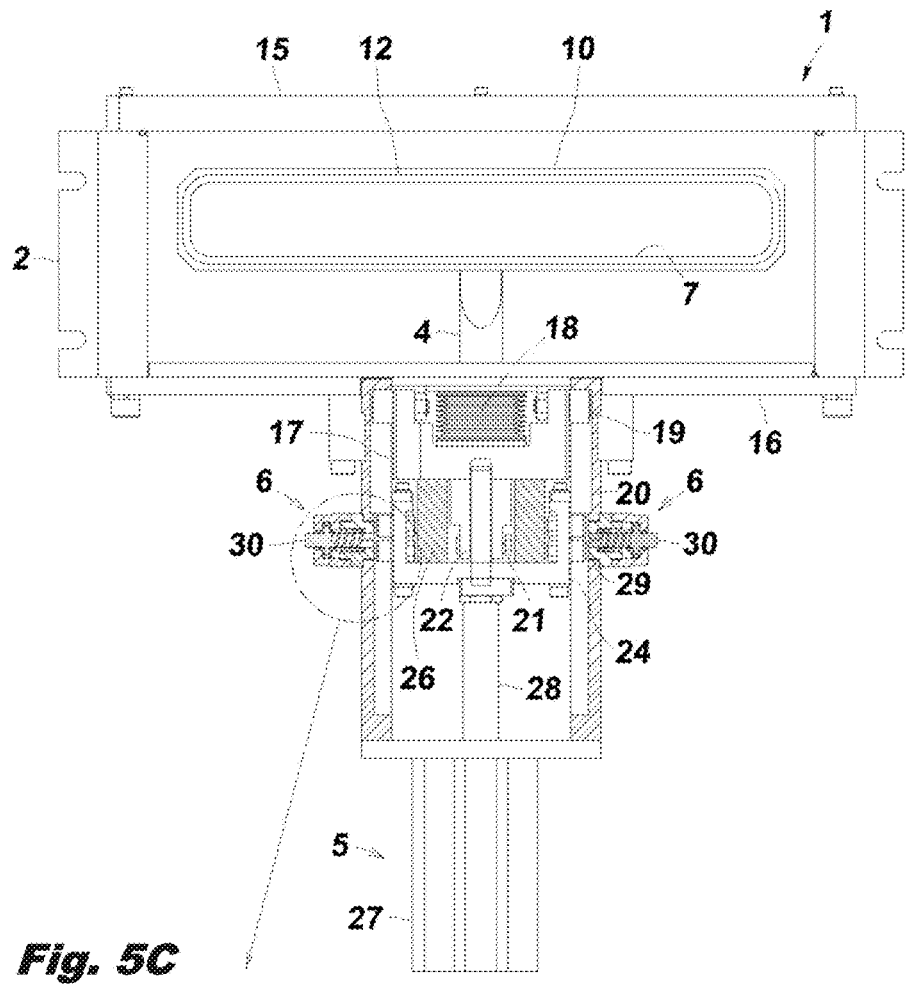
FIGS. 5A-5C illustrate a "CLOSE 2" state when a second valve plate of the gate valve according to the present invention closes a second opening part.
Figure 5B:
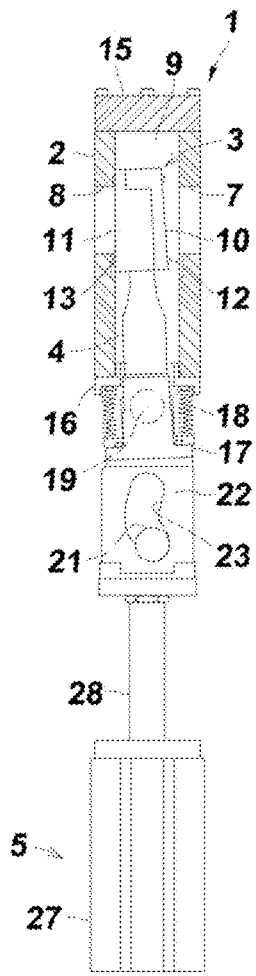
Figure 5C:
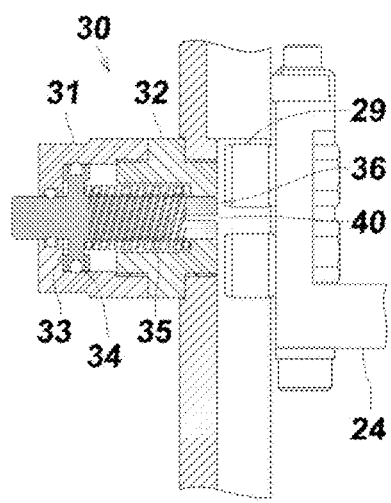

When the air cylinder 27 is driven by the drive mechanism 5 having the above-described configuration, the valve rod 4 moves upward or downward a predetermined stroke via the cam 22 linked to the cam plate 24, and, thereby, the valve plates 3 attached to the valve rod 4 move to a predetermined height in the valve box 2 and stop. Further, when the direction switching roller 21 is positioned at an upper end position (center) of the cam groove 23, the valve rod 4 stands at a center of the valve box 2; when the direction switching roller 21 is in a middle position (left side) of the cam groove 23, the valve rod 4 rotates around the fulcrum roller 19 and tilts toward the right side; and, when the direction switching roller 21 is at a lower end position (right side) of the cam groove 23, the valve rod 4 rotates around the fulcrum roller 19 and tilts toward the left side. As a result, at the upper end position of the cam groove 23, as illustrated in FIGS. 2A and 2B, the valve plates 3 (10, 11) attached to the valve rod 4 open both the opening parts 7, 8; at the middle position of the cam groove 23, as illustrated in FIGS. 3A-3E, the first valve plate 10 closes the first opening part 7; and at the lower end position of the cam groove 23, as illustrated in FIGS. 5A-5C, the second valve plate 11 closes the second opening part 8.

As illustrated in FIGS. 3A-3E, the stopper mechanism 6 is provided in the middle of a stroke of the air cylinder 27, and has a function of regulating or releasing regulation on the upward movement of the valve rod 4 by moving back and forth by supplying compressed air or stopping the supply of the compressed air. As the stopper mechanism 6, in the present embodiment, spring return type stopper pins 30 are provided on both left and right sides of the drive mechanism 5. As illustrated by the enlarged view of FIG. 3C, the stopper pins 30 each have a structure in which a pin rod 36 sealed by a packing 34 and biased by a spring 35 is housed inside a closed space 33 formed by attaching a rod cover 32 to a body 31. The body 31 of each of the stopper pins 30 is connected to a solenoid valve 38 via an air pipe 37 (see FIGS. 1A-1C).

On end surfaces of the cam plate 24 facing the stopper pins 30, the load receiving rollers 29 are respectively installed at positions corresponding to those of the pin rods 36. Further, as a vibration reducing device, front ends of the pin rods 36 are subjected to slit-processing to relax an impact during a collision with the load receiving rollers 29 and are each provided with a slit 40 formed by a cut in a horizontal direction as illustrated in FIG. 3D. The slit 40 may have a depth of at least a collision width between the load receiving rollers 29 and the pin rods 36. As an example of the vibration reducing device, counterbore-processing may be performed instead of slit-processing, and a circular counterbore 41 may be provided at a center of each of the pin rods 36 as illustrated in FIG. 3E.

As illustrated in FIG. 3C, when compressed air is supplied from a compressed air supply port 39 into the body 31 from the solenoid valve 38 via the air pipe 37 by the stopper mechanism 6 having the above-described configuration, the pin rod 36 is pushed forward against a spring force of the spring 35 and moves forward, and the front end of the pin rod 36 protrudes from an end surface of the rod cover 32. Therefore, the load receiving roller 29 of the cam plate 24 collides with the front end of the pin rod 36 and is caught, and the upward movement of the valve rod 4 connected to the cam plate 24 is regulated. In this case, the impact during the collision is absorbed by the slit 40 of the pin rod 36, and thus, vibration can be reduced.

On the other hand, when the supply of the compressed air from the solenoid valve 38 is stopped, as illustrated in FIG. 5C, the pin rod 36 is pushed back by a reaction force of the spring 35 and moves backward, and the front end of the pin rod 36 is retracted to the end surface of the rod cover 32. Therefore, the load receiving roller 29 of the cam plate 24 does not collide with the front end of the pin rod 36, and the regulation is released, and the valve rod 4 connected to the cam plate 24 moves upward to a stroke end of the air cylinder 27.

In the above, the structure of the gate valve 1 of the present embodiment is described. Next, an operation thereof is described.

FIGS. 2A and 2B illustrate an "OPEN" state when the gate valve 1 is fully open. FIGS. 3A-3E illustrate a "CLOSE 1" state when the first valve plate 10 of the gate valve 1 closes the first opening part 7. FIGS. 4A-4C illustrate an operation from the "OPEN" state to the "CLOSE 1."

As illustrated in FIG. 4A, when the valve rod 4 moves downward and the direction switching roller 21 is at the upper end position (center) of the cam groove 23, the valve rod 4 stands at the center of the valve box 2, and the gate valve 1 is in an open state in which the first valve plate 10 and the second valve plate 11 are respectively away from the first opening part 7 and the second opening part 8. In this state, a substrate can be passed from the second opening part 8 (the transfer chamber side) to the first opening part 7 (the process chamber side).

Here, in order to reach the "CLOSE 1" state in which the process chamber side is closed, compressed air is supplied from the solenoid valve 38. As a result, the pin rods 36 of the stopper pins 30 move forward in the horizontal direction, and the front ends of the pin rods 36 protrude from the end surfaces of the rod cover 32. Further, in FIG. 7A, by driving the air cylinder 27, the entire cam plate 24 is pushed up from below by a force of the compressed air, and, while compressing the coil spring 26, the valve rod 4 moves upward by a predetermined stroke via the cam 22 connected to the cam plate 24.

Then, as illustrated in FIG. 7B, when the fulcrum roller 19 of the rod guide 17 hits the upper end of the groove of the roller guide 20, as illustrated in FIG. 4B, the valve plates 3 (10, 11) move to a height position corresponding to the opening parts 7, 8. In this case, the air cylinder 27 has left a stroke.

Next, the direction switching roller 21 starts to move along the cam groove 23 to start a sealing operation. In this case, the load receiving roller 29 collides with the pin rods 36, and the direction switching roller 21 moves to the middle position (left side) of the cam groove 23 and causes the valve rod 4 to tilt to the right side. As a result, as illustrated in FIG. 4C, the first valve plate 10 is joined to the first opening part 7 and the "CLOSE 1" state is reached in which the first opening part 7 is sealed, and the sealing operation is completed.

When the valve is re-opened, the state of the valve rod 4 changes in the order of FIG. 4C→FIG. 4B→FIG. 4A. That is, a normal valve opening and closing operation is a reciprocating operation of from FIG. 4A to FIG. 4C.

FIGS. 5A-5C illustrate a "CLOSE 2" state in which the second valve plate 11 of the gate valve 1 closes the second opening part 8. FIGS. 6A→6D illustrate an operation from the "OPEN" state to the "CLOSE 2" state.

As illustrated in FIG. 6A, when the valve rod 4 moves downward and the direction switching roller 21 is at the upper end position (center) of the cam groove 23, the valve rod 4 stands at the center of the valve box 2, and the gate valve 1 is in the open state in which the first valve plate 10 and the second valve plate 11 are respectively away from the first opening part 7 and the second opening part 8.

Here, in order to reach the "CLOSE 2" state in which the transfer chamber side is closed, the supply of the compressed air from the solenoid valve 38 is stopped. As a result, the pin rods 36 of the stopper pins 30 move backward in the horizontal direction, and the front ends of the pin rods 36 retract to the end surfaces of the rod cover 32. Further, by driving the air cylinder 27, the entire cam plate 24 is pushed up from below by a force of the compressed air, and, while compressing the coil spring 26, the valve rod 4 moves upward a predetermined stroke via the cam 22 connected to the cam plate 24, and, as illustrated in FIG. 6B, the valve plates 3 (10, 11) move to the height position corresponding to the opening parts 7, 8.

Further, since the load receiving rollers 29 of the cam plate 24 do not collide with the front ends of the pin rods 36 and the regulation of the valve rod 4 is released, the valve rod 4 moves upward to the stroke end of the air cylinder 27. In doing so, the direction switching roller 21 starts to move along the cam groove 23 and starts a maintenance operation. In this case, as illustrated in FIG. 7C, the direction switching roller 21 moves to the lower end position (right side) of the cam groove 23 and causes the valve rod 4 to tilt to the left side. As a result, as illustrated in FIG. 6D, the second valve plate 11 is joined to the second opening part 8 and the "CLOSE 2" state is reached in which the second opening part 8 is sealed, and the maintenance operation is completed.

In the "CLOSE 2" state, when the maintenance flange 15 of the valve box 2 is removed to open the lid, and the bolt 14 illustrated in FIG. 1C is loosened to detach the first valve plate 10 from the valve rod 4, the first valve plate 10 can be taken out from the valve box 2. Therefore, by setting a side, which is close to the first valve plate 10, as the "CLOSE 1" side, maintenance work such as cleaning of the first valve plate 10 or replacement of the O-ring 12 can be performed while maintaining airtightness of the chamber in the "CLOSE 2" state. Putting it another way, the set side above may be determined as a side at which resistance is required to the O-rings 12, 13 because the side faces a more severe atmosphere (or environment) than the other side.

When the valve is re-opened, the state of the valve rod 4 changes in the order of FIG. 6D→FIG. 6C→FIG. 6B→FIG. 6A.

That is, a valve opening and closing operation during maintenance is a reciprocating operation of from FIG. 6A to FIG. 6D.

Figure 8:
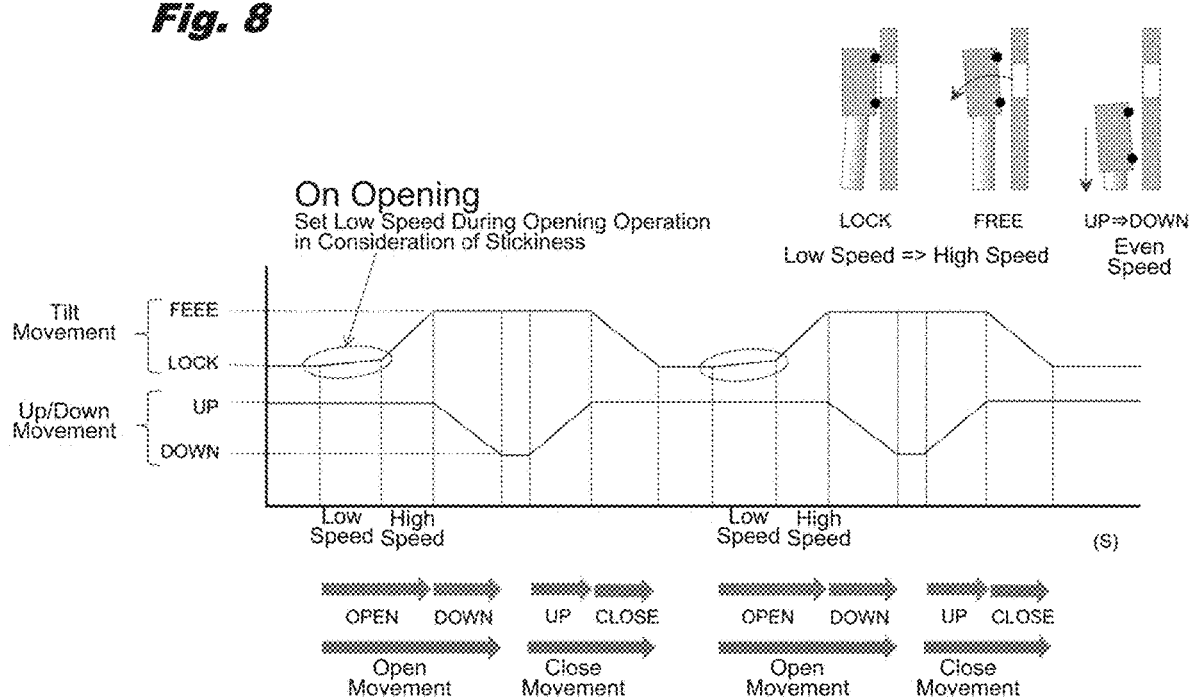
FIG. 8 is a timing chart illustrating an operation based on a delay circuit of the gate valve according to the present invention.

Further, the gate valve 1 of the present embodiment is provided with a delay circuit as a vibration reducing device that sets a speed, at which the valve plates 3 start to move away from valve seat surfaces of the valve box 2 when the valve is opened, to a low speed. FIG. 8 illustrates an operating speed of the valve rod 4 based on the delay circuit. When the valve is opened from a fully closed state and the valve plates 3 stuck to the valve seat surfaces are peeled off, vibration and noises occur. Therefore, by taking into account of an effect of the sticking, nozzle opening is adjusted, and thereby, as illustrated in FIG. 8, during the opening operation, the operating speed is set such that a speed at which the valve plates 3 start to move is set to a low speed and the speed is gradually increased during the operation.

Figure 9:
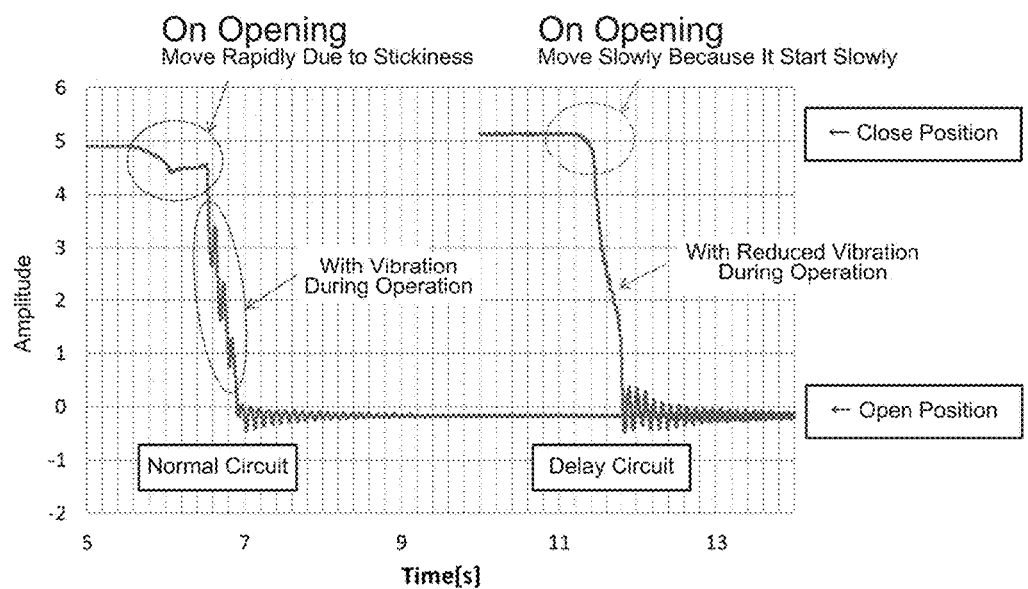
FIG. 9 is a graph in which operation vibration of the delay circuit of the gate valve according to the present invention is compared to that of a normal circuit.

FIG. 9 illustrates a comparison in an amplitude (or amplitude amount) versus operation time relationship (operation vibration) between a normal circuit and the delay circuit. As illustrated in FIG. 9, when the valve is opened, in the normal circuit, the valve moves rapidly due to sticking, and thus, the amplitude is large during the opening operation, and this causes dust to be generated with the vibration. In contrast, in the delay circuit, the valve starts slowly and moves slowly, and thus, it can be seen that the amplitude during the opening operation is small and swinging is significantly reduced. Therefore, according to the gate valve 1 of the present embodiment, the vibration of the valve rod 4 can be reduced by the delay circuit, and generation of dust due to vibration can be suppressed.

As described above, in the present embodiment, as a means for stopping the valve rod 4 at a predetermined position, the stopper mechanism 6 is provided without using a 3-position stop air cylinder, and, by supplying or stopping the supply of the compressed air from the solenoid valve 38, the pin rods 36 of the stopper pins 30 move forward or backward to regulate or release regulation on the upward movement of the valve rod 4. The stopper pins 30 normally protrude and are set to retract during maintenance, and stop the load receiving rollers 29 as force points with the pin rods 36 to change the direction of the force acting on the valve plates 3 as the point of action, and thereby, can switch the sealing direction between the opening parts 7, 8 on the front and rear sides depending on the stopping position of the pin rods 36. Therefore, there is no need to perform control by adjusting a pressure when the valve rod 4 is stopped at an intermediate sealing position, and thus, the sealing performance when the valve is closed by the valve plates 3 (10, 11) can be stabilized.

What is claimed is:

1. A gate valve that opens or closes opening parts provided on both sides of a valve box with a valve plate arranged inside the valve box, comprising:
   a valve rod that is connected to the valve plate and is supported to be able to move upward or downward and tilt inside the valve box;
   a drive mechanism that is provided outside the valve box and moves the valve rod upward or downward by a predetermined stroke and tilts the valve rod;
   a stopper mechanism that includes a spring return type stopper pin provided in middle of the stroke of the drive mechanism, and in which, when compressed air is supplied, a pin rod of the stopper pin moves forward in a horizontal direction orthogonal to a stroke direction of the valve rod against a spring force of a spring, and a cam plate connected to the valve rod or a load receiving roller attached to the cam plate collides with the pin rod to regulate an upward movement of the valve rod, and, on the other hand, when the supply of the compressed air is stopped, the pin rod moves backward in the horizontal direction due to a reaction force of the spring, so that the cam plate or the load receiving roller does not collide with the pin rod and the regulation on the upward movement of the valve rod is released; and
   a vibration reducing device that reduces vibration generated when the valve rod is operated by the drive mechanism.

2. The gate valve according to claim 1, wherein
as the vibration reducing device, the pin rod of the stopper pin is subjected to slit-processing or counterbore-processing to reduce an impact during a collision with the cam plate or the load receiving roller.

3. The gate valve according to claim 1, wherein
as the vibration reducing device, a delay circuit is provided that sets a speed, at which the valve plate starts to move away from a valve seat surface of the valve box when the valve is opened, to a low speed.

4. The gate valve according to claim 1, wherein
a valve plate surface of the valve plate tilts such that an O-ring fixed to the valve plate is parallelly pressed against a valve seat.

5. The gate valve according to claim 1, wherein
the opening parts (7, 8) are a pair of openings, which are a first opening part and a second opening part, and arranged in parallel to face each other,
the valve plate is configured with a pair of valve surfaces (10, 11), which are first and second valve surfaces and arranged in parallel to face one of the opening parts wherein the first valve surface (10) corresponds to the first opening part (7) and the second valve surface (11) corresponds to the second opening part (8), and each of the valve surfaces is surrendered with an elastic seal material,
the predetermined stroke by the drive mechanism is
   to linearly move the valve rod up to a height of the first and second opening parts such that the first and second opening parts and the valve surfaces are positioned at a same height, and next,
   to tile the valve rod toward one of the first and second opening parts to close the opening with the seal material wherein the one of the first and second opening parts is determined by higher resistance of the seal material being required than the other of the first and second opening parts.

\* \* \* \* \*